US010829889B1

(12) United States Patent
Olver et al.

(10) Patent No.: US 10,829,889 B1
(45) Date of Patent: Nov. 10, 2020

(54) THERMAL ENHANCEMENT ADDITIVES USEFUL FOR FABRICS

(71) Applicant: EMISSHIELD, Inc., Blacksburg, VA (US)

(72) Inventors: John W. Olver, Blacksburg, VA (US); John G. Dillard, New Castle, VA (US)

(*) Notice: Subject to any disclaimer, the term of this patent is extended or adjusted under 35 U.S.C. 154(b) by 84 days.

(21) Appl. No.: 14/605,726

(22) Filed: Jan. 26, 2015

Related U.S. Application Data

(60) Provisional application No. 61/930,955, filed on Jan. 24, 2014.

(51) Int. Cl.
*D06M 23/14* (2006.01)

(52) U.S. Cl.
CPC ........ *D06M 23/14* (2013.01); *D06M 2200/00* (2013.01)

(58) Field of Classification Search
CPC ........................... D06M 23/14; D06M 2200/00
See application file for complete search history.

(56) References Cited

U.S. PATENT DOCUMENTS

| | | | |
|---|---|---|---|
| 5,569,427 A * | 10/1996 | Semenova | C03C 8/14 106/286.8 |
| 6,034,003 A | 3/2000 | Lee et al. | |
| 6,037,280 A | 3/2000 | Edwards et al. | |
| 7,262,160 B2 | 8/2007 | Black | |
| 8,534,305 B1 | 9/2013 | Weedall et al. | |
| 2005/0051057 A1 * | 3/2005 | Evans | C04B 41/009 106/287.34 |
| 2007/0218280 A1 * | 9/2007 | Yabuki | D01F 1/10 428/366 |
| 2010/0059095 A1 | 3/2010 | Hinz et al. | |
| 2011/0143109 A1 | 6/2011 | Beser et al. | |
| 2012/0047624 A1 | 3/2012 | Hubsmith | |
| 2012/0156462 A1 | 6/2012 | Bisjak et al. | |
| 2014/0230694 A1 * | 8/2014 | Klamklang | F27D 1/0006 106/286.4 |

FOREIGN PATENT DOCUMENTS

| | | |
|---|---|---|
| CN | 102051721 A * | 5/2011 |
| JP | 2002038370 A * | 2/2002 |
| JP | 2003089922 A * | 3/2003 |
| WO | 2012172256 A2 | 12/2012 |

OTHER PUBLICATIONS

Translation of CN 102051721, H. Chen, May 11, 2011, p. 1-5.*
Translation of JP 2002-038370, Yamamoto et al., Feb. 6, 2002, p. 1-12.*
Translation of JP 2003089922, Satoshi Yamazaki, Mar. 28, 2003, p. 1-8. (Year: 2003).*

* cited by examiner

*Primary Examiner* — Hai Vo
(74) *Attorney, Agent, or Firm* — Mary-Jacq Holroyd; Johnston Holroyd

(57) ABSTRACT

Additives containing a filler, and an emissivity agent are combined for thermal enhancement, which may further include a reflectivity agent, a stabilizer, or combinations thereof. The additive is used in the production of cloth or the modification of cloth including clothing, home goods, and temporary shelters, and may be used in screen printing and three dimensional applications. More than one type of filler, emissivity agent, reflective agent, and stabilizer may be used.

4 Claims, 2 Drawing Sheets

THERMAL ENHANCEMENT ADDITIVES USEFUL FOR FABRICS

RELATED APPLICATIONS

This application claims the benefit of U.S. Provisional Application Ser. No. 61/930,955 entitled "Thermal Enhancement Additives Useful for Fabrics" filed on 24 Jan. 2014, the contents of which are incorporated herein by reference in its entirety.

BACKGROUND OF THE INVENTION

Efforts to produce fabrics with good thermal characteristics, which keep the wearer cool and/or warm, and include weaving fabrics out of wool and cotton. More recently, fibers and fabrics have been manufactured from polymers, including nylon, polyester, acrylic, rayon, acetate, spandex, latex, and Kevlar. Fabrics are useful for clothing, bedding, drapes, tents, upholstery, carpeting, and the like, for both domestic and commercial purposes.

Fibers, textiles, cloth, and high technology fibers are used in many industries, and may be coarse or fine in their texture and threading. Some textiles are pressed together such as felt. Efforts to select and improve materials with desirable thermal characteristics have long existed. In the clothing industry, both wool and cotton are chosen for their thermal characteristics. Tent, curtain, and awning materials are chosen for their thermal characteristics. Unfortunately, while wool or cotton may be very warm in the winter, the same cloth may not be cool in the summer. Tent material may also be too cool or too warm depending on the weather conditions. Materials exposed to direct sunlight tend to fade and deteriorate quickly.

Most fabrics, fibers, textiles are passive materials regarding thermal performance. In other words, most have no impact on thermal or spectral properties, and do not significantly change or block the thermal wavelengths passing through them. US Patent Application No. US20120156462 A1 teaches ultraviolet protective fabrics based on man-made cellulosic fibers which incorporates $TiO_2$ pigment into a synthetic or cellulose fibers or mixtures thereof. U.S. Pat. No. 6,037,280 A teaches an ultraviolet ray blocking textile containing a fabric, silicate mineral particles, and a binder to bind the silicate mineral particles to the fabric. Clothing using UV enhancing agents to modify some of their spectral characteristics are known. Such clothing frequently last through a limited number of washings before losing their UV enhancing characteristics.

Many applications have been conceived for UV protection or enhancement. U.S. Pat. No. 7,262,160 B2 teaches dyes used to impart UV protection into clothing. US Patent Application No. US20110143109 teaches a safety orange for hunters which is modified for optimum visibility at long visible wavelengths of 595-605 nm while damping emissions in shorter nm including UV.

U.S. Pat. No. 6,034,003 A teaches an ultraviolet radiation protective clothing that incorporates zinc and UV absorbing compounds known as melanins. US Patent No. US20120047624 A1 teaches a sun protective clothing system in which the fabric has an Ultraviolet Protection Factor of 15 or greater. Tents and shelters incorporating UV ray blocking elements are disclosed in WO2012172256A2, US20100059095, and U.S. Pat. No. 8,534,305.

SUMMARY OF THE INVENTION

The present invention comprises an emissivity agent; and may further comprise, a reflectivity agent, a filler, stabilizer, a combined effect agent, and/or combinations thereof.

In the simplest design, a filler and an emissivity agent are combined. Alternative designs further incorporate a reflectivity agent. Stabilizers may be added to either embodiment. Particle size and weight basis of each emissivity agent and reflectivity agent are important, and may be modified according to application.

The present invention is drawn to an improved additive that imparts desirable thermal and spectral characteristics into, or on, the material it is incorporated into, or applied to the surface of, fabric, material, or the like. With natural fibers such as wool, the additive may be disposed in a layer thereon or absorbed within the wool.

A great diversity of materials composed of fibers, textiles, and cloth, including but not limited to clothing, home goods, materials exposed to direct sunlight or weather, industrial applications of fibers in heat, such as carpeting, and rugs, and the like, may benefit from enhanced thermal characteristics. These materials are further useful for medical, performance, and sports applications. Furthermore, the materials may be used to produce a thermally neutral curtain in which no heat is seen through the material, and from the perspective of either side, will appear ambient, near ambient, or uniform thermal paradigm. This property may be used to generate thermal indicia in the material that can only be observed using a thermal sensor or viewer.

The additive of the present design may also be used in three-dimensional printer ink, including for printing circuit boards and over electrical circuits to modulate the UV through IR (UV-IR) electromagnetic paradigm.

Consumer and industrial fabrics have improved heat uniformity, re-radiation/reflective properties, and enhanced or reduced thermal conductivity.

Used as an invisible, micro layer of coating or mixed directly into a fiber, additives of the present invention can be applied to either improve heat transfer through or away from any fabric.

Demonstrated benefits include uses in outerwear, sportswear, tents, awnings, and furniture. Furthermore, the additives are non-toxic and very easy to incorporate into any fabric. Cost is reduced over conventional insulation or thermal enhancing fabric compositions. The additives are permanently incorporated into the fabrics, and can therefore provide SPF protection without washing out over time or from prolonged exposure to the sun.

Further aspects of the present additives are that they may be incorporated into fibers, or coated onto fibers or fabrics, and used to reduce the heat transfer between sides of a fabric incorporating the additives. As an example, tents composed of such fibers or bearing a layer of coating within the fabric layers thereof may be left in direct sunlight without unduly heating the interior of the tent. Conversely, the insides of the tent may be kept warm without undue loss of heat through the fabric of the tent. The thermal additive may be used to have cooling and/or heating thermal impact in fabric for the same application.

Such tents may be fashioned to be thermally opaque or thermally opaque at some but not other wavelengths. This characteristic may be used to depart thermal indicia upon the tent in which some coated or uncoated areas present a different thermal paradigm from the other coated areas. Clothing may also be designed to be thermally opaque and/or to have thermally distinct indicia.

The IR blocking characteristics may be used to block IR radiation in clothing, tents, curtains, and the like rendering these items invisible to night vision goggles. This characteristic may also be used to generate indicia by using the thermal enhancement ink/coating to paint or screen print indicia on a surface that emits or absorbs heat to create indicia which can be observed utilizing night vision goggles.

These and other aspects of the present invention will become readily apparent upon further review of the following drawings and specification.

BRIEF DESCRIPTION OF THE DRAWINGS

The novel features of the described embodiments are specifically set forth in the appended claims; however, embodiments relating to the structure and process of making the present invention, may best be understood with reference to the following description and accompanying drawings.

Similar reference characters denote corresponding features consistently throughout the attached drawings.

DETAILED DESCRIPTION OF PREFERRED EMBODIMENTS

Figure 1A:
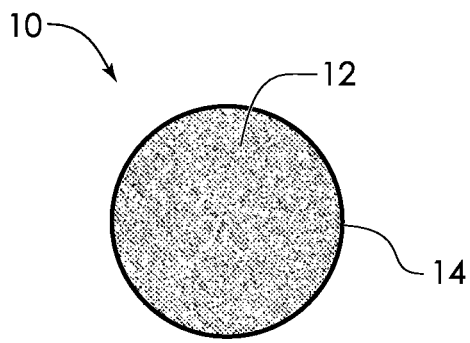
FIG. 1A shows a fiber with the additive incorporated therein in which the additive is incorporated into the composition of the fiber and dispersed evenly therethrough.
Figure 1B:
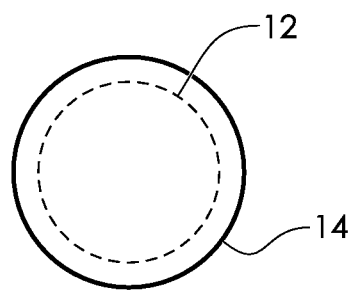
FIG. 1B shows a fiber with the additive incorporated therein in which the additive is incorporated along the outer perimeter of the fiber.
Figure 1C:
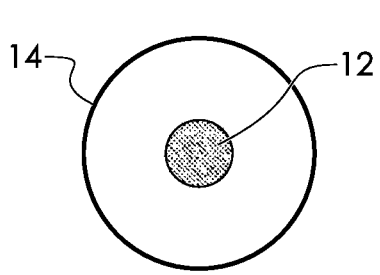
FIG. 1C shows a fiber with the additive incorporated therein in which the additive is incorporated along the outer perimeter of the fiber.

The alternative designs of the present patent application are useful to improve thermal, spectral, and physical performance enhancing characteristics of a variety of materials, including the incorporation of the additive into individual fibers and in coating applications for all fabric types. FIGS. 1A-1C shows fabric component 10 having a fiber 14 with the additive 12 incorporated therein. FIGS. 2A-2E show a fiber 14 or cloth 16 with the additive disposed within a coating 18 thereon. As used herein, all weights are percent dry weight, and particle sizes are in microns (mµ). Furthermore, all percentages (%) are percent Weight-to-Weight, also expressed as Weight/Weight %, %, (W/W), W/W, W/W % or simply %, unless otherwise indicated.

FIG. 1A has the additive 12 mixed into the composition of the fiber and dispersed evenly therethrough. FIG. 1A is further representative of a filament for 3D printing or extrusion applications in which emissivity and thermal enhancement are desirable. In FIG. 1B, the additive 12 is disposed along the outer perimeter, and in FIG. 1C, the additive 12 is disposed in the core of the fiber.

Figure 2A:
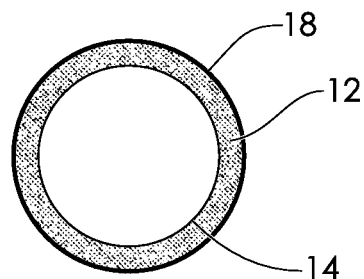
FIG. 2A shows a cloth fiber or filament with the additive disposed in a coating thereon.
Figure 2B:
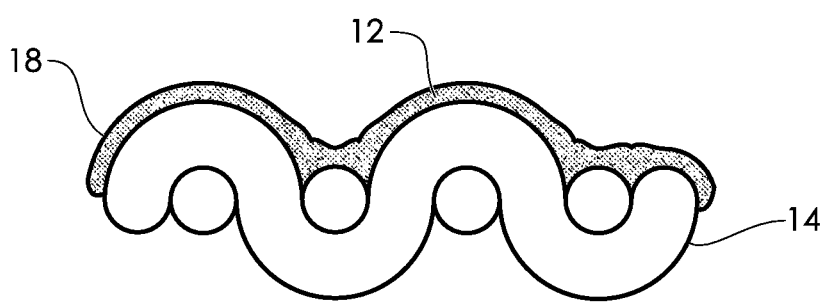
FIG. 2B shows a woven cloth with the additive disposed in a coating thereon.
Figure 2C:
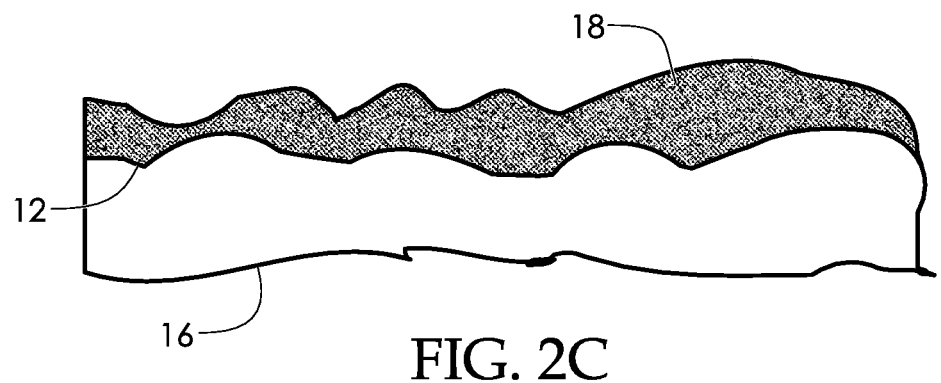
FIG. 2C shows a nonwoven cloth with the additive disposed in a coating thereon.
Figure 2D:
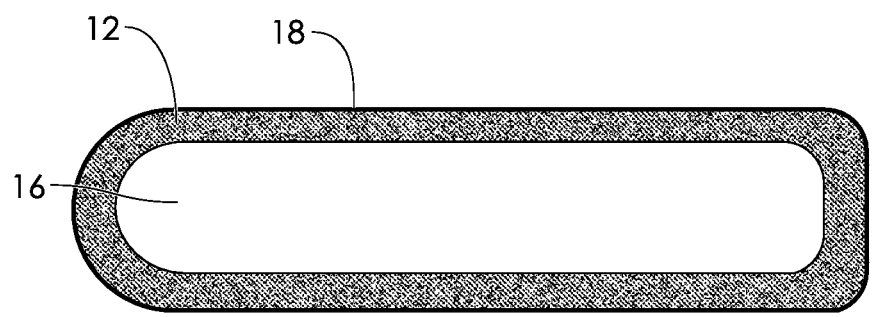
FIG. 2D shows a cloth with the additive disposed in a coating on all exposed parts thereof.
Figure 2E:
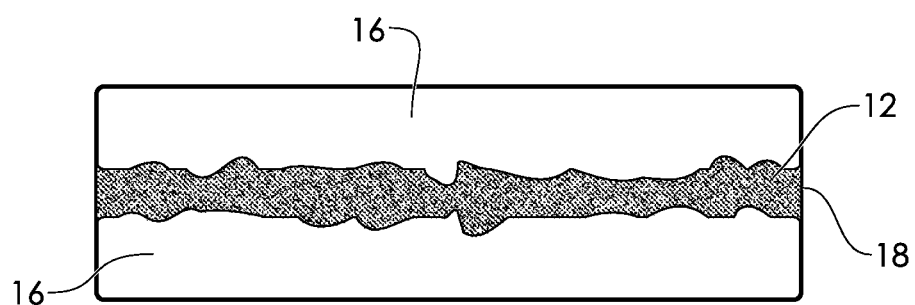
FIG. 2E shows a cloth with the additive disposed in a coating or adhesive disposed between layers of cloth forming a cloth composed of layers.

FIG. 2A demonstrates a basic fiber coated with a layer having the additive 12 disposed therein. FIGS. 2B-2E are similar except that the additive 12 containing coated layer 18 is disposed as shown. FIG. 2B demonstrates a woven example while the other three are layers disposed on, or in a layer within, an underlying fabric. FIG. 2C show a nonwoven cloth with the additive 12 disposed in a coating thereon. FIG. 2D shows a cloth with the additive 12 disposed in a coating on all exposed parts thereof. FIG. 2E show a cloth with the additive 12 disposed in a coating or adhesive 12 disposed between layers of cloth forming a cloth composed of layers.

Aspects of the present design include performance enhancements which may include improved thermal and spectral performance, ultraviolet protection factor (UPF), moisture vapor transport, infrared shielding/enhancement, reduction in infrared signature, solar absorptivity/reflectivity among other improvements. The additive 12 may also be used in inks or coatings 18 which may be used to paint or write on any screen print application. Many clothing applications involve the screen printing of images onto cloth. Additionally, three dimensional inks may incorporate the additives therein.

This additive may be incorporated and improve, not only fabric manufacturing or fabric coatings and inks, but the addition of performance enhancing materials makes new fabrics and coatings (and inks) for fabrics for uses in sportswear, bedding, industrial fabrics, tents and awnings and most fabric applications. The basic scientific principles of emissivity, reflectivity, absorption and re-radiation, singly or in combination, may account for the performance enhancements noted in fibers, coatings, inks, and the resulting fabrics/materials produced.

The additives 12 of the present design modulate not only the UV and IR wavelengths, but may also serve to protect the material from exposure to damaging visible wavelengths and x-rays, as well. IR-UV wavelengths modulated by the additive of the present invention provide desirable characteristics to the additive and materials incorporating the additive.

Examples of usages for these additives include fiber additions, coatings, and inks. Fiber additions include incorporating the additive into the fiber polymers as they are being manufactured during the compounding process. The additive may also be wicked into manmade or natural filamentous threads/fibers. Fabric coatings or textile inks are applied to the surfaces of fabrics. Coatings are typically applied evenly across the entire material, whereas inks may be partially applied to the surfaces of fabrics (or other substrates) as a screen process or on a secondary carrier such as a film which is then applied to a substrate. The coatings may also be wicked into porous cloth.

Fiber polymers that may be utilized to incorporate the performance enhancing materials noted herein into the fiber compounding process include but are not limited to: polyolefin, nylons, polyester, etc. After incorporating the materials identified herein into the compounded material, that material is extruded into a single or multiple filaments which are then processed into and refined via various existing fabric manufacturing steps.

Various weight basis amounts, particle size distributions and different performance material proportions can be utilized to achieve different fabric properties and performance results from the materials. The basic scientific principles of emissivity, reflectivity, conduction/insulation, absorption and re-radiation singly or in combination account for the performance enhancements observed in the fiber and the resulting fabrics produced. Textile coating and ink applications of the performance enhancing materials are accomplished by blending the materials into existing coating formulations for fabrics (polyolefin, nylon, polyester, PVC, etc.) and using conventional fabric application methods. Any existing coating formulation can be utilized as the base material and varying weight, types and particle distributions of the performance enhancing materials can be utilized.

The properties of reflectivity, emissivity, absorption and re-radiation can be combined and varied to arrive at the desired performance standard. In addition to the general performance enhancements noted above, an increase in "R" factor and infrared shielding can also be achieved. The following tables include the general listing of performance enhancing materials utilized in alternatives of the present design. These materials are incorporated into the thermal enhancement compounds. The emissivity agents are depicted in Table 1. At least one emissivity agent is present in each embodiment of the present design, and more than one may be present.

TABLE 1

Emissivity Agents

| Component | Particle Size |
|---|---|
| Boron Carbide | 0.1-7 μm |
| Boron Carbide | 0.7 μm |
| Silicon Carbide (green) | 0.7 μm |
| Silicon Carbide (black) | <1 μm |
| Silicon Hexaboride | 0.5-4 μm |
| Boron Nitride | 0.5-2 μm |
| Zirconium Diboride | 0.5-10 μm |
| Hafnium Diboride | 0.5-10 μm |
| Zirconium Boride | 0.5-10 μm |
| Zirconium Carbide | 0.5-10 μm |
| Hafnium Carbide | 0.5-10 μm |
| Zirconium Dioxide | 0.5-10 μm |
| Tungsten Boride | 0.5-10 μm |
| Tungsten Carbide | 0.1-1 μm |
| Molybdenum Oxide | 0.5-10 μm |
| Cerium Hexaboride | 0.5-10 μm |
| Yitrium Oxide | 0.5-5 μm |
| Copper Oxide | 0.5-10 μm |
| Cerium Oxide | 0.5-10 μm |
| Terbium Oxide | 0.1-5 μm |
| Copper Chromium Oxide | 0.1-5 μm |
| Manganese Oxide | 0.1-10 μm |
| Tungsten Disilicide | 0.5-5 μm |
| Iron Oxide | 0.1-10 μm |
| Molybdenum Disilicide | 0.5-5 μm |
| Silicon Tetraboride | 0.5-5 μm |

These alternative emissivity agents impart desirable thermal and spectral characteristics into most fabrics. These compositions added to clothing modulate the UV and IR spectrum of the material generating a desirable thermal and spectral characteristic. The thermal and spectral characteristics of unmodified material used in clothing, or in designs on clothing—such as screen printing may be modified using the additive incorporated in the screen printing materials. Screen printing applications are not limited to cloth, however, and may also be used on the sides of automobiles, sign indicia, and the like.

Reflectivity Agents are depicted in Table 2, and operate to modify the reflectivity of the material in addition to the thermal and spectral modulation provided by the emissivity agents.

TABLE 2

Reflectivity Agents

| Component | Particle Size |
|---|---|
| Aluminum Oxide | 0.5-2 μm |
| Aluminum Oxide | 1-4 μm |

TABLE 2-continued

Reflectivity Agents

| Component | Particle Size |
|---|---|
| Silica | 0.1-2 μm |
| Silica | 1-5 μm |
| Titanium Dioxide | 0.5-1 μm |
| Zinc Oxide | 1-2 μm |
| Tin Oxide | 1-2 μm |
| Magnesium Oxide | 1-2 μm |
| Calcium Carbonate | 0.1-2 μm |
| Zirconium Dioxide | 0.5-10 μm |
| Manganese Oxide | 0.1-10 μm |
| Boron Oxide | 0.5-5 μm |
| Calcium Oxide | 0.5-5 μm |

Fillers are used in alternatives of the present design and are listed in Table 3.

TABLE 3

Fillers

| Component | Particle Size |
|---|---|
| Silica | 0.01-2 μm |
| Silica | 1.0-2 μm |
| Calcium Oxide | 0.1-10 μm |
| Aluminum Oxide | 0.1-10 μm |

Stabilizers, listed in Table 4, may be incorporated into the additive to increase the shelf-life of the additive.

TABLE 4

Stabilizers

| Component | Particle Size |
|---|---|
| Colloidal Silica | 0.001-0.01 μm |
| Ball clay minerals | 0.1-1 μm |
| Bentonite | 0.1-1 μm |
| Kaolin | 0.1-1 μm |
| Montmorillonite | 0.1-1 μm |

Ball clay minerals may include kaolinite, mica, and quartz. Kalonite is a white or gray aluminosilicate clay mineral.

Combined Effect Agents are listed in Table 5, and may be used as both emissivity and reflectivity agents.

TABLE 5

Combined Effect Agents

| Component | Particle Size |
|---|---|
| Titanium Dioxide | 0.5-2 μm |
| Boron Nitride | 0.5-1.5 μm |
| Zirconium Dioxide | 0.5-10 μm |
| Aluminum Oxide | 0.5-2 μm |
| Aluminum Oxide | 1.0-4 μm |
| Vanadium Dioxide | 0.2-10 μm |

It is important to recall that more than one emissivity agent, reflectivity agent, or combined effect agents may be used in a single application to any appropriate combination of fillers and stabilizers.

Colorants may be added to the chosen additives, or used separately, and may be pigments or dyes. These colorants include organic and inorganic pigments. Examples which may be used include those shown in Table 6.

TABLE 6

Inorganic Colorants

| Material | Color | Particle size |
|---|---|---|
| Hematite | Red | 0.5-5.0 μm |
| Cr, Fe, Ni Ferrite Spinel | Black | 0.1-2.5 μm |
| Mn Ferrite Spinel | Black | 0.5-5.0 μm |
| Cobalt Aluminate Spinel | Blue | 0.1-1.2 μm |

The present invention is not limited to the following examples, but incorporates all alternatives. The following performance enhancing material combinations are possible and formulations corresponding to A, B, C and D are examples of typical formulations for addition to fiber compounding or coating applications in fabric. Suitable organic and inorganic colorants are well known, and are available from BASF.

Several Typical "formulation" combinations are:
A 70-90% filler+10-30% emissivity agent
B 70-90% filler+5-15% emissivity agent+5-15% reflectivity agent
C 70-90% filler+3-5% stabilizer+10-20% emissivity agent
D 65-85% filler+3-5% stabilizer+5-15% emissivity agent+5-15% reflectivity agent
E 60-80% filler+10-25% emissivity agent+5-10% combined effect agent
F 60-80% filler+10-25% emissivity agent+5-10% combined effect agent+1-5% colorant
G 60-80% filler+5-15% emissivity agent+5-10% reflectivity agent+1-5% combined effect agent
H 60-80% filler+5-15% emissivity agent+5-10% reflectivity agent+1-5% combined effect agent+1-5% colorant
I 60-80% filler+3-5% stabilizer+10-20% emissivity agent+1-5% combined effect agent
J 60-80% filler+3-5% stabilizer+10-20% emissivity agent+1-5% combined effect agent+1-5% colorant
K 55-75% filler+1-5% stabilizer+5-15% emissivity agent+5-15% reflectivity agent+1-5% combined effect agent
M 55-75% filler+1-5% stabilizer+5-15% emissivity agent+5-15% reflectivity agent+1-5% combined effect agent+1-5% colorant An example of a product according to "formulation A" would include 70-90% (w/w) filler taken from the selection of materials, including one of the silicas; plus an emissivity agent at 10-30% (w/w) from the selection of emissivity components, including metal borides, metal carbides, metal oxides, non-metal borides, non-metal carbides, and non-metal nitrides.

An example of a product according to "formulation B" would include 70-90% (w/w) filler taken from the selection of materials including one of the silicas; plus an emissivity agent at 5-15% (w/w) taken from the selection of emissivity components including metal borides, metal carbides, metal oxides, non-metal borides, non-metal carbides and non-metal nitrides; and plus a reflectivity agent at 5-15% (w/w) taken from the selection of reflectivity agents, including metal oxides, non-metal oxides and metal carbonates.

An example of a product according to "formulation C" would include 70-90% (w/w) filler taken from the selection of materials, including one of the silicas; plus 3-5% (w/w) stabilizer taken from the selection of stabilizers, including fumed silica; and plus an emissivity agent at 10-20% (w/w) from the selection of emissivity components, including metal borides, metal carbides, metal oxides, non-metal borides, non-metal carbides, and non-metal nitrides.

An example of a product according to "formulation D" would include 65-85% (w/w) filler taken from the selection of materials, including one of the silicas; plus 3-5% (w/w) stabilizer taken from the selection of stabilizers, including fumed silica; plus an emissivity agent at 5-15% (w/w) taken from the selection of emissivity components, including metal borides, metal carbides, metal oxides, non-metal borides, non-metal carbides, and non-metal nitrides; and plus a reflectivity agent at 5-15% (w/w) taken from the selection of reflectivity agents, including metal oxides, non-metal oxides and metal carbonates.

An example of a product according to "formulation E" would include 60-80% (w/w) filler taken from the selection of materials; plus an emissivity agent at 10-25% (w/w) taken from the selection of emissivity components; and plus a combined effect agent at 5-10% (w/w). An example of a product according to "formulation F" would include 60-80% (w/w) filler, plus 10-25% (w/w) emissivity agent, 5-10% (w/w) combined effect agent, and 1-5% (w/w) colorant. An example of a product according to "formulation G" would include 60-80% (w/w) filler, 5-15% emissivity agent, 5-10% (w/w) reflectivity agent, and 1-5% (w/w) combined effect agent.

An example of a product according to "formulation H" would include 60-80% (w/w) filler, plus 5-15% (w/w) emissivity agent, plus 5-10% (w/w) reflectivity agent, plus 1-5% (w/w) combined effect agent, and 1-5% (w/w) colorant. An example of a product according to "formulation I" would include 60-80% (w/w) filler, plus 3-5% (w/w) stabilizer, plus 10-20% (w/w) emissivity agent, and 1-5% (w/w) combined effect agent. An example of a product according to "formulation J" would include 60-80% (w/w) filler, plus 3-5% (w/w) stabilizer, plus 10-20% (w/w) emissivity agent, 1-5% (w/w) combined effect agent, and 1-5% (w/w) colorant.

An example of a product according to "formulation K" would include 55-75% (w/w) filler, 1-5% (w/w) stabilizer, 5-15% (w/w) emissivity agent, 5-15% (w/w) reflectivity agent, 1-5% (w/w) combined effect agent. An example of a product according to "formulation M 55-75% (w/w) filler, 1-5% (w/w) stabilizer, 5-15% (w/w) emissivity agent, 5-15% (w/w) reflectivity agent, 1-5% (w/w) combined effect agent, and 1-5% (w/w) colorant.

Three dimensional printer applications include incorporating any of the product formulations into any thermoplastic including ABS (acrylonitrile butadiene styrene copolymer), polycarbonate (PC), polylactic acid (PLA), high density polyethylene (HDPE), ABS/PC, polyphenyl sulfone (PPSU), nylon (NY), epoxy (EP), RTV silicones, polyetherether ketone (PEEK), polyvinyl alcohol (PVA), and the like. Additives to promote flowing and spreading during the printing process may also be added. Another list of possible printer compositions utilized in extrusion printing includes thermoplastics (e.g. PLA, ABS), HDPE, eutectic metals, rubber (sugru), modelling clay, plasticine, RTV silicone, porcelain, metal clay (including precious metal clay), and the like, which are useful with fused deposition modeling. Granular printing using selective heat or laser sintering which utilizes thermoplastics, metal powder, and ceramic powders may incorporate the additive into their compositions.

Alternatively, the additive 12 may be used as a layer or disposed in a layer, and may be incorporated into an adhesive applied on the surface, or between layers of alternative printing paradigms including laminated printing, plaster based printing, and light polymerized printing processes. The additive 12 may be incorporated into the powder bed or compositions utilized within powder bed and inkjet head 3D printing. Special attention must be paid for light polymerized and ultra violet or infrared cured compositions to avoid undesirable interactions in the UV-IR and visible light spectra. These photopolymers are polymers that change their properties when exposed to light. Common thermoplastics include acrylic, nylon, polyethylene, polypropylene, polyolefin, polystyrene, polyvinyl chloride, Teflon, and the like.

Fiber additives 12 according to alternatives of the present design compounded directly into polymers which are then used to form cloth. The additive 12 may be directly mixed with powder forms of precursor materials whether printed or fibrous. The additive may be used in the mill process. The additive may be compounded into a mix with polymers and extruded as pellets, fibers, or filament strands. The filaments or fibers may be processed into yarn. Texturizers may be utilized. The resultant material may then be cut, and made into curtains, clothing, or other fabric. Resultant fabric coatings may be used on tents, or other coated products, to modify thermal characteristics, improve wicking, and strengthen the underlying material. An additional embodiment permits the use of small bits of coated fiber, or flakes, which may be made by fractioning coated fibers. Alternatively, flakes may also be made by fractioning fibers with the additives incorporated therein.

Coated Nylon Fabrics (Korean Coated Nylon) were prepared using blue and black nylon samples, and coated with a high emissivity thermal protective coating having thermal enhancement additives corresponding to a coating containing (composition 1): $SiO_2$ was from 60-90 Percent, Fumed Silica was from 1 to 10 percent, and Alumina from 10 percent to 20 percent with all weights being percent dry weight and particle sizes are variable from 0.001 micron to 5 micron. This embodiment demonstrates both reflective and absorptive thermal characteristics which can be seen from the test results demonstrated in Table 6.

The objective of the studies and measurements was to determine the light absorbing and thermal response characteristics of the fabrics upon exposure to solar radiation. Two embodiments were used containing composition 1, one control also contained black pigment while the other control contained blue pigment. Four experimental coatings prepared according to the present design, two of which contained blue pigment and two of which contained black pigment. Coating A contained composition 1 at 5.6 g/m2 Blue-A and Black-A. Coating B contained CF-131g at 7.5 g/m2 in Blue B and Black B.

The light absorbing characteristics of the samples were made by placing two thicknesses of fabric on a white paper and measuring the solar absorptivity using a Surface Optics 410 solar reflectometer. The reflectometer measures specular, diffuse and total reflectance at seven different wavebands in the visible and near infrared regions (330 to 2500 nm). Six individual solar absorptivity measurements were made on each surface of the fabrics and the results were averaged.

The thermal response characteristics of the fabrics were made by placing single thickness strips (~18" long by ~7" wide) of the control and the test specimen side-by-side on a rectangular support frame. The samples were stretched to remove wrinkles and were held in tension using metal binder clips. The samples were placed in the sun in a manner such that the coated fabric surface was approximately perpendicular to the sun. During exposure, thermal readings were taken at 10, 20 and 30 min intervals and were averaged. The temperature measurements were made using an optical pyrometer (Omega Scope model OS530LE) and a FLIR infrared camera (FLIR model T420). Temperature measurements were made for the front (coated) and back (uncoated) surfaces of the fabric specimens.

The results are summarized below, in Table 7. The specific temperature readings and differences in temperature readings (delta T) are given in the summary below. Solar absorptivity is given, enclosed in parenthesis, following the sample name.

TABLE 7

Summary of Test Results (Composition 1)

| Sample | sun (pyro) front | sun) (pyro) back | delta T front/ back | sun (FLIR) front | sun (FLIR) front | delta T front/ back |
| --- | --- | --- | --- | --- | --- | --- |
| Blu-B (0.368) | 82 | 87 | −5 | 81.9 | 83.8 | −1.9 |
| Blu-ctl (0.363) | 80 | 84 | −4 | 78.6 | 77.9 | +0.7 |
| Delta T:coat-ctl | +2 | −3 | | +3.3 | +5.9 | |
| Blk-A (0.613) | 91.5 | 92 | −0.5 | No FUR data taken | | |
| Blk-ctl (0.606) | 83 | 86 | −3 | | | |
| Delta T:coat-ctl | +8.5 | +6 | | | | |
| Blk-B (0.615) | 90.5 | 99.5 | −9 | 91 | 88 | +3 |
| Blk-ctl (0.606) | 84 | 86.5 | −2.5 | 85.8 | 81.1 | +4.7 |
| Delta T:coat-ctl | +6.5 | +13 | | +5.2 | +6.9 | |

Thermocouples of coated and uncoated fabrics were taken on the outer (exposed) surface and on the inner (unexposed) surface after ten minutes in direct sunlight. The same analysis was carried out by placing coated and uncoated fabrics in a black box with a red bulb heat lamp after ten minutes. Data was also generated from FUR cameras.

Brown Jordan (trademark) fabrics were coated with a coating layer containing the thermal enhancement additives (composition 2) from 60 to 90 percent $SiO_2$, 1 to 10 percent fumed silica, and from 10 to 20 percent boron carbide. All weights are percent dry weight and particle sizes are 0.001 micron to 5 micron. This composition demonstrates absorptive characteristics.

In direct sunlight for ten minutes, the exposed surface of the uncoated fabric reached 150 degrees Fahrenheit while the exposed surface of the uncoated fabric reached 100 degrees Fahrenheit, which was a reduction of 50 degrees Fahrenheit. The unexposed surface of the uncoated fabric reached 137 degrees Fahrenheit while the unexposed surface of the coated fabric reached 88 degrees Fahrenheit which represented a reduction of 49 degrees Fahrenheit. The difference in temperature between the exposed and unexposed surfaces were 12 degrees for the coated fabric and 13 degrees for the uncoated fabric. In the black box with a red bulb heat lamp after ten minutes, the front of the uncoated fabric reached 240 degrees Fahrenheit while the coated fabric reached 294 degrees Fahrenheit, which represents an increase of 54 degrees Fahrenheit. In contrast, the back side of the coated and uncoated had a decrease of 7 degrees Fahrenheit, with the temperature of the coated fabric being 260 degrees Fahrenheit and uncoated fabric being 267 degrees Fahrenheit. In this test, the delta T for the coated fabric was −34, while the delta T for the uncoated fabric was +27.

The data from the FLIR camera in direct sunlight for ten (10) minutes for coated and uncoated fabrics. Coated fabric temperatures were 123 degrees Fahrenheit on the front face and 104 degrees Fahrenheit on the back face, which represented a difference of −19 F. The uncoated fabric measured 112 degrees Fahrenheit on the front face versus 110 degrees Fahrenheit on the back face, which is a delta T of −2 F. The front face coated versus uncoated had a delta T of +11 F, while the back face had a delta T of −6 F It is to be understood that the present invention is not limited to the embodiments described above, but encompasses any and all embodiments within the scope of the following claims.

What is claimed is:

1. A carrier for thermal enhancement additives useful for fabrics, comprising:
   a plurality of fibers and a thermal enhancement additive incorporated therein or thereon to selectively modulate the UV through IR (UV-IR) electromagnetic paradigm thereof at ambient weather temperatures,
   the fibers comprising natural fibers and/or polymeric fibers selected from the group consisting of polyolefin, nylon, polyester, polyvinylchloride, and combinations thereof,
   the thermal enhancement additive comprising:
   a combination of performance enhancing materials composed of component particles having from about 55% to about 90% of a filler and from about 5% to about 20% of at least one emissivity agent,
   wherein the filler is selected from the group consisting of silica having a particle size from about 0.01 to about 2 μm, calcium oxide having a particle size from about 0.01 to about 10 μm, and aluminum oxide having a particle size from about 0.1 to about 10 μm, and
   wherein at least one emissivity agent each having a particle size from about 0.1 to about 10 μm is selected from the group consisting of boron carbide, silicon carbide, boron nitride, zirconium diboride, hafnium diboride, hafnium diboride, zirconium carbide, zirconium boride, zirconium carbide, hafnium carbide, zirconium dioxide, tungsten boride, tungsten carbide, molybdenum oxide, cerium hexaboride, vitrium oxide, copper oxide, cerium oxide, terbium oxide, copper chromium oxide, manganese oxide, tungsten disilicide, molybdenum disilicide, vanadium dioxide, and silicon tetraboride, and combinations thereof;
   wherein the selected filler is not the same as the selected emissivity agent(s);
   wherein the at least one emissivity agent is free of iron oxide;
   wherein the alternative combinations of performance enhancing materials determines the UV-IR electromagnetic paradigm of the carrier; and
   wherein the fibers incorporating the thermal enhancement additive therein or thereon selectively modulates the V-IR electromagnetic paradigm of fabrics having the carrier.

2. The carrier of claim 1, wherein
   the thermal enhancement additive is incorporated into a coating disposed upon the fiber;
   the thermal enhancement additive is incorporated directly into the composition of the fibers;
   the thermal enhancement additive is trapped within a void formed between adjacent fibers; or combinations thereof.

3. The carrier of claim 1, wherein the thermal enhancement additive further comprises
   a combination of performance enhancing materials composed of component particles having from about 1% to about 20% of a reflectivity agent having a particle size from about 0.1 to about 10 μm selected from the group consisting of aluminum oxide, silica, zinc oxide, tin oxide, magnesium oxide, calcium carbonate, zirconium dioxide, cerium oxide, manganese oxide, boron oxide, calcium oxide, titanium dioxide, boron nitride, vanadium dioxide, and combinations thereof;
   from about 1% to about 5% of a stabilizer selected from the group consisting of colloidal silica having a particle size from about 0.001 to about 0.01 μm, ball clay minerals having a particle size from about 0.1 to about 1 μm, bentonite having a particle size from about 0.1 to about 1 μm, kaolin having a particle size from about 0.1 to about 1 μm,
   and montmorillonite having a particle size from about 0.1 to about 1 μm, and combinations thereof;
   up to about 5 percent of a colorant; or combinations thereof; and
   wherein the selected reflectivity agent is not the same as the selected filler or the selected emissivity agent.

4. The carrier of claim 2, wherein the thermal enhancement additive further comprises
   a combination of performance enhancing materials composed of component particles having from about 1% to about 20% of a reflectivity agent having a particle size from about 0.1 to about 10 μm selected from the group consisting of aluminum oxide, silica, zinc oxide, tin oxide, magnesium oxide, calcium carbonate, zirconium dioxide, cerium oxide, manganese oxide, boron oxide, calcium oxide, titanium dioxide, boron nitride, vanadium dioxide, and combinations thereof;
   from about 1% to about 5% of a stabilizer selected from the group consisting of colloidal silica having a particle size from about 0.001 to about 0.01 μm, ball clay minerals having a particle size from about 0.1 to about 1 μm, bentonite having a particle size from about 0.1 to about 1 μm, kaolin having a particle size from about 0.1 to about 1 μm, and montmorillonite having a particle size from about 0.1 to about 1 μm, and combinations thereof;
   up to about 5 percent of a colorant; or combinations thereof; and
   wherein the selected reflectivity agent is not the same as the selected filler or the selected emissivity agent.

* * * * *